Jan. 4, 1927.　　　　　V. P. WILLIAMS　　　　　1,612,846
UNITARY SELECTIVE DRIVE DEVICE FOR VEHICLE PARKING APPARATUS
Filed Dec. 11, 1925　　　　2 Sheets-Sheet 1
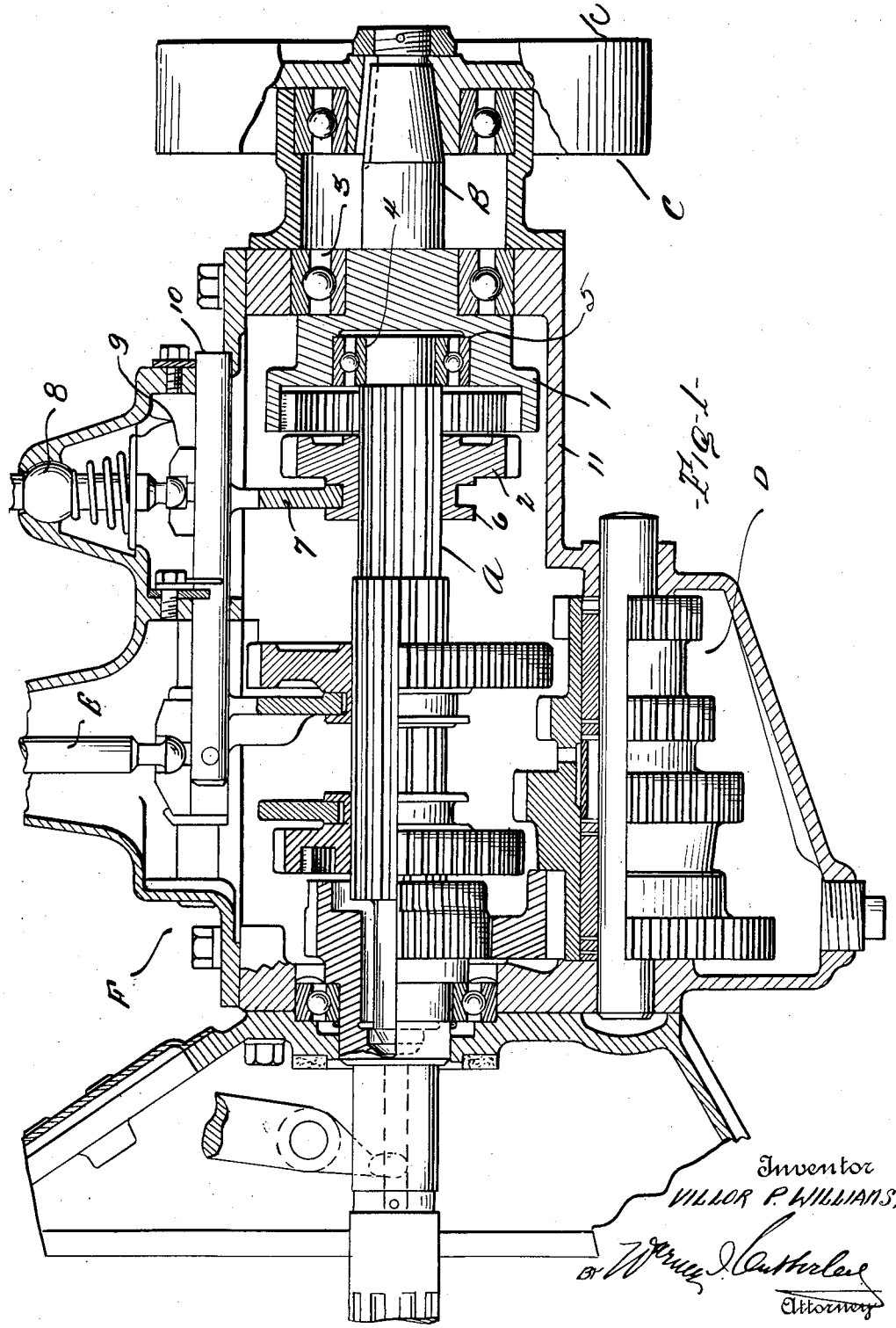
Inventor
VILLOR P. WILLIAMS

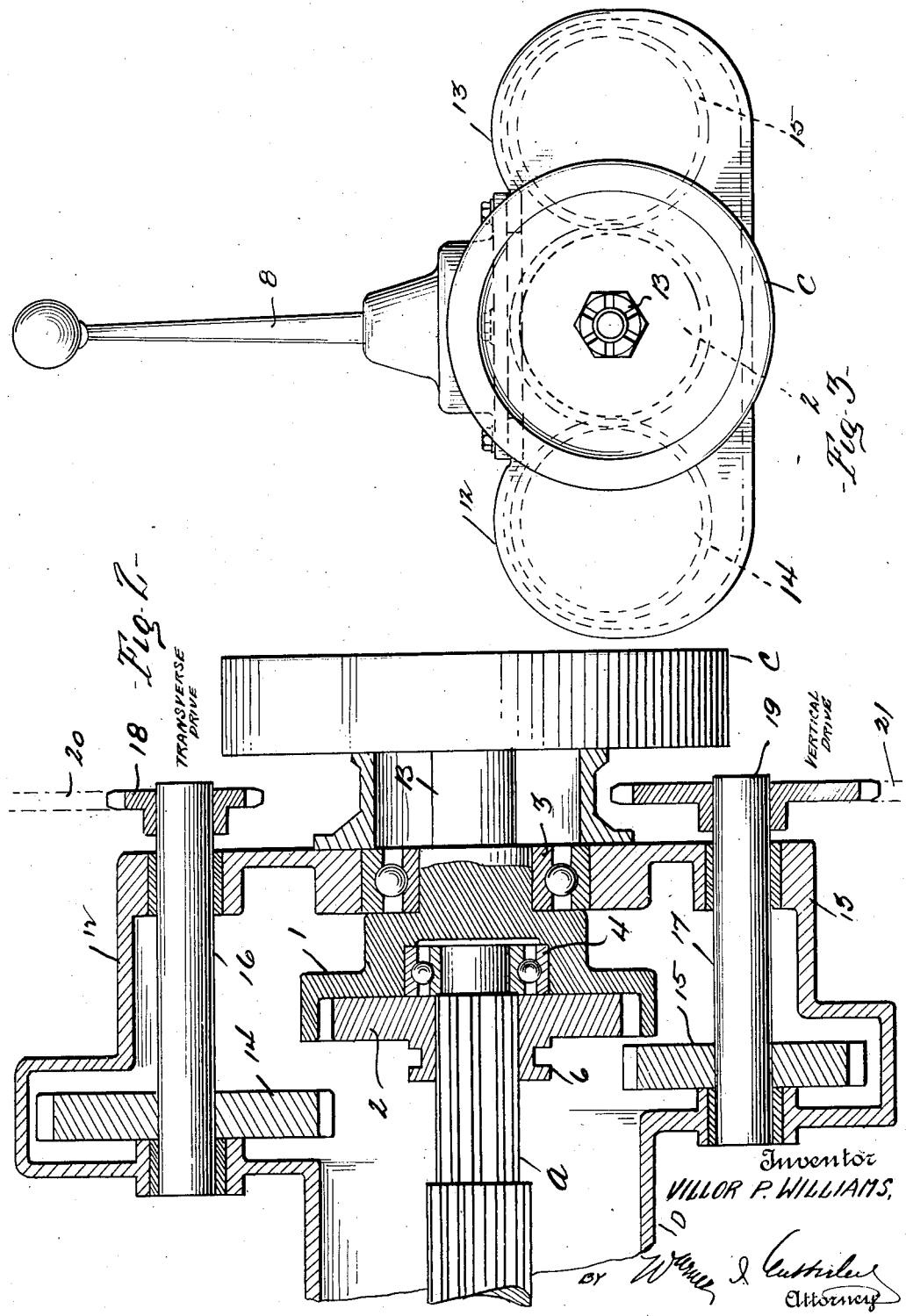

Patented Jan. 4, 1927.

1,612,846

UNITED STATES PATENT OFFICE.

VILLOR P. WILLIAMS, OF BALTIMORE, MARYLAND, ASSIGNOR TO MIRIAM S. F. WILLIAMS, OF BALTIMORE, MARYLAND.

UNITARY SELECTIVE DRIVE DEVICE FOR VEHICLE PARKING APPARATUS.

Application filed December 11, 1925. Serial No. 74,723.

My present invention has reference, in its broad aspect, to improvements in unitary selective drive devices for use with means for bodily raising and laterally moving a vehicle, truck, tractor, or other power driven body of the type defined in my co-pending application for patent filed February 16th, 1926, Serial Number 86,574. In my co-pending application referred to means including driving couplings are shown for bodily raising a vehicle on an even horizontal axis through the instrumentality of jacking devices, and other means including driving couplings are shown for moving the vehicle laterally (or traversing) after the same has been jacked up or raised. My present invention is an improvement in power take-off mechanism and directional drive controls from the main vehicle drive shaft, and more particularly it is my purpose to incorporate such mechanism directly in the transmission casing thereby greatly simplifying the assembly.

Considered more specifically my present invention consists in embodying in a conventional transmission housing a selective directional drive device having a series of co-operating gears designed to be thrown to cause actuation in clockwise or counter-clockwise directions a pair of drive shafts—one for the means described in my above identified co-pending application for bodily raising a vehicle, and the other for the means described therein for moving the vehicle bodily in a lateral direction. To these ends I provide a single internally toothed driven gear fixed to the driven shaft of a motor vehicle and adjacent its transmission gears, and cooperating with said gear another gear splined to the drive shaft to complete a driving coupling upon the occasion of actuating the traction mechanism of a vehicle in the usual manner, but disengageable therefrom to form a selective drive coupling in conjunction with two other gears when it is desired to raise or traverse or laterally move a vehicle by the means described in my co-pending application. Consequently by utilizing the conventional transmission of a motor vehicle I am enabled by these simple, compact and effective means to empower two shafts (one for actuating the jacking or vehicle raising mechanism, and the other for actuating the traversing or lateral moving mechanism) to rotate in either direction.

A few of the additional advantages of my invention may be briefly defined as follows;—first, I render my selective drive absolutely positive through selectively intermeshing gear shift devices; second, I utilize a single gear for both coupling the drive with the driven shaft of a vehicle and empowering and controlling the rotation of my jacking and traversing mechanism; third, I am enabled to attain these ends through the unique arrangement of but four gears, and; fourth, all of my aforementioned mechanism is arranged to be contained in the usual transmission case of a conventional motor vehicle.

The particular elements of my device employed to accomplish the above and other equally important objects will be hereinafter more fully described in detail and pointed out in the claims appended hereunto and forming a part of this specification.

In the accompanying drawings wherein is illustrated the preferred embodiment of my invention;—

Figure 1 is a sectional side elevation of my device and shows its relationship to a conventional vehicle transmission assembly;—

Figure 2 is a sectional detail view of my unitary selective drive per se, and

Figure 3 is an end view of the same.

In the drawings wherein like characters of reference are used to designate like or similar parts throughout the several views;—

(A) designates the drive shaft of a motor vehicle, (B) the driven shaft, (C) the drum, and (D) the transmission gearing assembly which is controllable through the usual gear shift lever (E). (F) designates a conventional form of transmission casing. The foregoing mechanism is common to various types of motor vehicles and forms no part of my invention per se.

Fixed on the end of the driven shaft (B) is an internally toothed female clutch member (1) which is adapted to mesh with a male clutch member (2) mounted for independent sliding movement only on the splined end of the drive shaft (A). Clutch member (1) is antifrictionally journalled as at (3) in the casing (F), and the end of the shaft (A) is also antifrictionally journalled as at (4) in a cylindrical recess (5) of the clutch member (1). The clutch member (2) is formed with an annularly grooved collar (6) in which is engaged a yoke (7) coupled with an operating lever (8) by means of a carriage (9) slidably mounted on the rod (10) carried in the casing (F). Normally the clutch member (2) is disposed in mesh with the internal teeth of clutch member (1) so that shafts (A) and (B) rotate in unison to drive a vehicle in the usual manner.

The casing (F) is elongated as at (11) to receive the mechanism comprising my invention, and has hollow lateral extensions (12) and (13) arranged to each side of the clutch members (1) and (2). In each of these extensions (12) and (13) is carried a gear, respectively (14) and (15), which are keyed to shafts (16) and (17) journalled in the walls of the extension as shown in Figure 2. The gears (14) and (15) are off-set transversely from one another and arranged on opposite sides of the clutch member (2) so that when the clutch member (2) is slid on the shaft (A) it will selectively mesh with either of the two.

Since the usual transmission (D) of a motor vehicle includes several speeds as well as the forward and reverse, either of the gears (14) and (15) may be driven at several speeds as well as in both directions of rotation by simply throwing the proper gears in the transmission (D) into mesh by the transmission lever (E). On the other hand the traction devices (not shown) of the vehicle are rendered inactive as soon as clutch member (2) is disengaged from clutch member (1), thus rendering the actuation of gears (14) and (15) effective only when the vehicle motor is active, and the traction devices passive.

The shafts (16) and (17) to which gears (14) and (15) are keyed are extended without the casing (F) and have mounted thereon toothed wheels (18) and (19) over which chains, shown in dotted lines at (20) and (21) are trained to actuate respectively the power couplings for raising and lowering the vehicle and moving the same laterally as described in my co-pending application filed February 6th, 1926, Serial #86,874, and which are not here shown since by reference to the application the construction and operation is obvious. The sizes of the toothed wheels (18) and (19) are different since the gear ratios necessary to attain desired driving speeds dictate that the raising and lowering operation should be carried on at a less rate of speed than the traversing or lateral movement operation of the vehicle.

In operation, when it is desired to park a vehicle, the clutch member (2) is moved out of engagement with the clutch member (1) by means of the lever (8). The vehicle is then brought to a stop and clutch member (2) is moved to engage gear (15)—marked Vertical drive—whereupon the shaft (17) is rotated to cause the vehicle to be raised through the mechanism described in my co-pending application hereinbefore identified. The vehicle having been raised to the proper height the drive is rendered inactive and the clutch member (2) moved to engage gear (14) to actuate shaft (16) to move the vehicle in a lateral direction. Assuming that direct drive of the motor will move the vehicle to the left, then by reversing the drive through the usual transmission (D) the vehicle may be moved with the same facility to the right. Or in other words "in and out from the curbing" of a roadway. To lower the vehicle, the vehicle drive D (actuated by shaft E) is left in reverse and the clutch member (2) again moved to engage gear (15) whereby to rotate the shaft in the opposite direction from the direction of rotation adapted to raise or elevate the vehicle.

While in the foregoing, there has been illustrated in the drawings and described in the specification such combination and arrangement of elements as constitute the preferred embodiments of my invention, it is nevertheless desired to emphasize the fact that interpretation of the invention should only be conclusive when made in the light of the subjoined claims.

I claim:—

1. The combination with a conventional type of change speed mechansm and the casing therefor, a sectional drive shaft, one section of which constitutes the driven shaft of said change speed mechanism, and both sections of which are in axial alignment, the adjacent ends of said sections of the drive shaft carrying respectively the interlocking elements of a clutch device, a pair of power take off gear units arranged to each side of said drive shaft and intergeared with the male clutch element for selective operation, and the casing of said change speed mechanism being extended to house said power take off gear units and form a bearing for one of the sections of said drive shaft.

2. The combination with a conventional type of change speed mechanism and the casing therefor, a sectional drive shaft, one section of which constitutes the driven shaft of said change speed mechanism, and both sections of which are in axial alignment with each other, the adjacent ends of said sections of the drive shaft carrying respectively the male and female elements of a clutch, a pair of power take off gear units arranged on opposite sides of said drive shaft and intergeared through a common instrumentality with the male element of the clutch for selective operation, and the casing of said change speed mechanism being extended rearwardly to house said power take off gear units and form a bearing for the section of said drive shaft carrying the female clutch element.

3. The combination with a conventional type of change speed mechanism and the casing therefor, a sectional drive shaft, one section of which constitutes the driven shaft of said change speed mechanism, and both sections of which are in relative axial alignment, the adjacent ends of said sections of the drive shaft carrying respectively the male and female elements of a clutch device, plural power take offs arranged in opposed relationship on different sides of said drive shaft and intergeared with the male clutch device for selective operation independently of each other, an integral extension formed on the casing of said change speed mechanism to house said power take offs, and means provided therein for journalling the section of said drive shaft carrying the female clutch element.

4. The combination with a conventional type of change speed gearing, the gear shift mechanism and lever therefor, and the casing, a sectional drive shaft, one section of which constitutes the driven shaft of said change speed gearing and is controllable through the gear shift lever, and both sections of which are in axial alignment, the adjacent ends of said sections of the drive shaft carrying respectively the male and female elements of an intermeshing gear clutch unit, power take off gear units arranged adjacent said drive shaft, the male gear clutch unit being shiftable on its section of the drive shaft to couple the two sections thereof or couple the section of the drive shaft to empower selectively the respective power take off units, and a supplementary shift mechanism and lever arranged adjacent to and independently of said change speed gearing shift mechanism and lever for shifting the male element of the clutch, and the casing of said change speed mechanism being extended to house said power take offs and shift mechanism therefor and form a bearing for one of the sections of said drive shaft.

In testimony whereof, I affix my signature hereunto.

VILLOR P. WILLIAMS.